United States Patent
Oar et al.

(10) Patent No.: US 7,657,765 B2
(45) Date of Patent: Feb. 2, 2010

(54) POWER SAVING FEATURES FOR COMPUTING SYSTEMS

(75) Inventors: Jeffrey R Oar, Corvallis, OR (US); Gregory J May, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 564 days.

(21) Appl. No.: 10/081,005

(22) Filed: Feb. 19, 2002

(65) Prior Publication Data

US 2003/0159074 A1    Aug. 21, 2003

(51) Int. Cl.
*G06F 1/26* (2006.01)
(52) U.S. Cl. ........................................ 713/320
(58) Field of Classification Search .................. None
See application file for complete search history.

(56) References Cited

U.S. PATENT DOCUMENTS

| | | | | |
|---|---|---|---|---|
| 5,043,721 A | | 8/1991 | May | |
| 5,600,576 A | * | 2/1997 | Broadwater et al. | 702/187 |
| 5,752,050 A | * | 5/1998 | Hernandez et al. | 713/330 |
| 6,271,752 B1 | * | 8/2001 | Vaios | 340/541 |
| 6,317,831 B1 | * | 11/2001 | King | 713/171 |
| 6,442,248 B1 | * | 8/2002 | Davis | 379/93.02 |
| 6,694,471 B1 | * | 2/2004 | Sharp | 714/749 |
| 6,772,169 B2 | * | 8/2004 | Kaplan | 707/102 |
| 6,785,724 B1 | * | 8/2004 | Drainville et al. | 709/227 |
| 2002/0023237 A1 | * | 2/2002 | Yamada et al. | 713/323 |

* cited by examiner

*Primary Examiner*—Thomas Lee
*Assistant Examiner*—Mohammed H Rehman

(57) ABSTRACT

A computing system responds to an event that wakes the computing system from a sleep mode. The computing system recognizes the event and responds to the event. The response includes generating an event notification message that is transmitted to an external device separate from the computing system. The transmission is performed via wireless communication. The computing system then returns to the sleep mode.

12 Claims, 3 Drawing Sheets

POWER SAVING FEATURES FOR COMPUTING SYSTEMS

BACKGROUND OF THE INVENTION

The present invention pertains to computers and pertains particularly to power saving features for portable computers and for other computing systems.

Portable computers vary widely in size and functionality. What is meant by a portable computer herein is any computing system that is easily transportable by a user and can be run by an included battery or batteries. Notebook computers and laptop computers are examples of portable computers. The wide variation in size and functionality of portable computers allows users very wide choice in selecting a portable computing device that satisfies the particular requirements and/or preferences of the user. For example, many portable computers provide functionality similar to a desktop computing system. These portable computers provide a full size keyboard, full size display, a fully functional operating system, and a large selection of input/output ports. In addition, add-on devices that use internal slots and PC card slots provide a great deal of expandability. Hard disk drives, floppy disk drives, compact disk read only memory (CDROM) drives, rewritable CD drives (CD-RW), digital video disk (DVD) drives and so on give a other storage options for portable computers.

The advanced features of a portable computer, however, come with a price. The price is not only monetary, but also can be in inconvenience to the user, such as the increase in size and weight of many portable computers, the power consumption necessary to support all the functionality and potential functionality of these portable computers and the boot-up time required to load the operating system at start time. Portable computers generally include sleep modes to conserve power while minimizing start-up times.

An alternative to a portable computer is a personal digital assistant (PDA). PDAs have the advantage of a reduced size and weight and reduced power consumption. The trade-off, however, is significantly reduced functionality. A PDA typically has reduced storage capability, a smaller display screen and a limited keyboard. The operating system for a PDA is often less versatile than that for a portable computer.

However, PDAs are often very well adapted for particular purposes. For example, a PDA can provide convenient access to features like a calendar, address book, to-do list, e-mail, expense tracking, memo-pad, dictionary, games, image viewers, maps, and so on. Additionally various attachments can be connected to a PDA to add additional functionality. These include, for example, expanded keyboards, global positioning system (GPS) receivers, modems, scanners, digital cameras, and so on. The simplified operating system of a PDA can be an advantage when it allows a quick (even instantaneous) start-up time for the PDA.

Wireless networks connecting computer devices are gaining increasing acceptability as an efficient means to communicate between computers. Wireless networks allow for interconnection of computing devices without hardware interconnection.

Wireless networks allow consumers to be connected to local devices as well as to provide connection to networks such as the Internet. The wireless access allows access to e-mail, fax and other forms of communication.

It is desirable to receive wireless communications, such as e-mail, fax and other forms of communication, into a portable computer even when the portable computer is in a suspend mode. However, this could present problems if a user is not notified appropriately. The present invention addresses communication with a portable computer while optimizing the ability of a portable computer to utilize its suspend mode.

SUMMARY OF THE INVENTION

In accordance with the preferred embodiment of the present invention, a computing system responds to an event that wakes the computing system from a sleep mode. The computing system recognizes the event and responds to the event. The response includes generating an event notification message that is transmitted to an external device separate from the computing system. The transmission is performed via wireless communication. The computing system then returns to the sleep mode.

DETAILED DESCRIPTION OF THE PREFERRED EMBODIMENT

Figure 1:
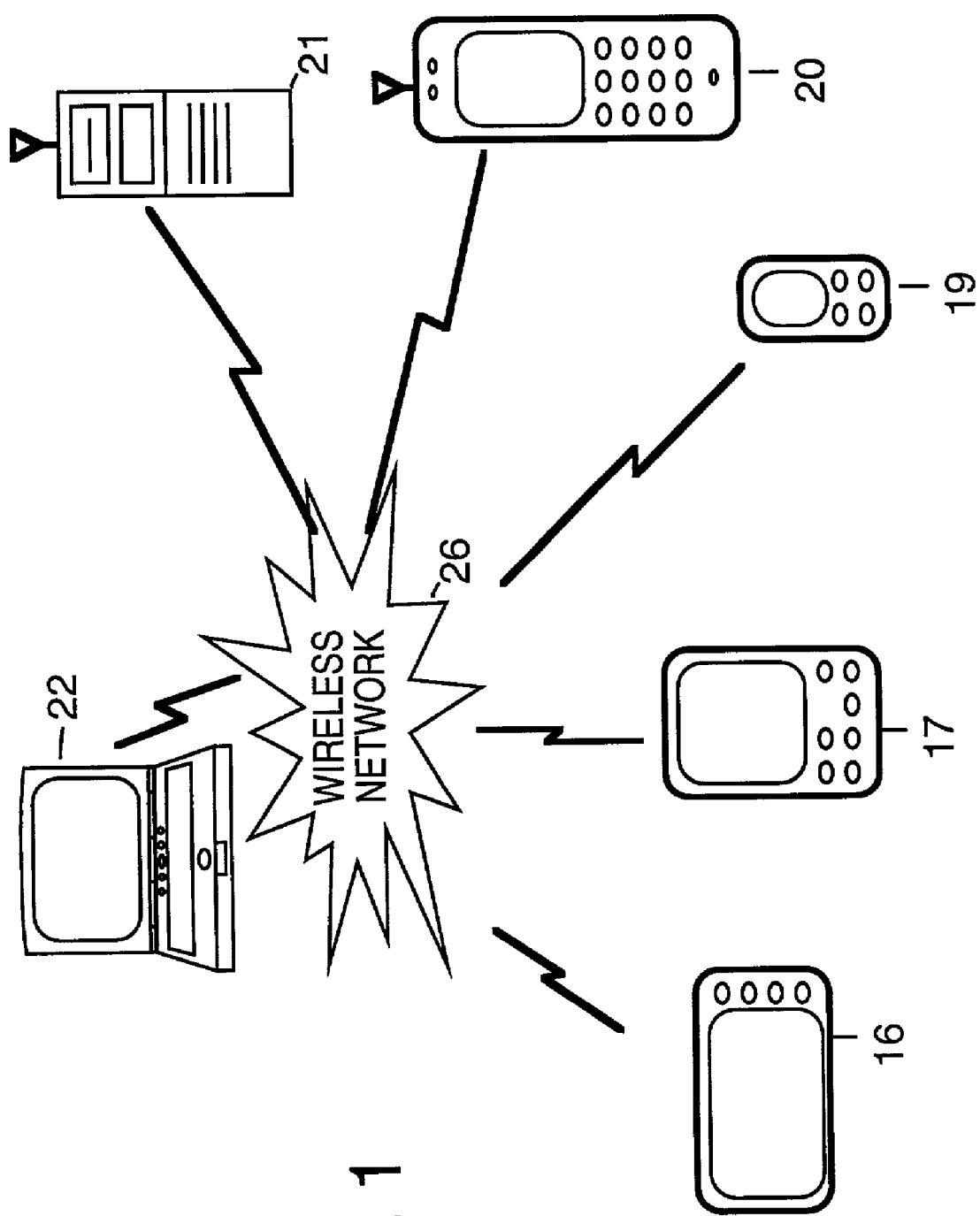
FIG. 1 is a simplified block diagram illustrating wireless communication of a portable computer with other devices.

FIG. 1 is a simplified block diagram illustrating wireless communication of a portable computer with other devices. Via a wireless network 26, a portable computer 22 can communicate with a personal digital assistant (PDA) 17, a pager 19, a dedicated display device 16, a cellular phone 20 and/or a desktop computer 21. For example, wireless network 26 is implemented using the BlueTooth wireless technology. BlueTooth wireless technology is a short distance radio frequency (RF) spread spectrum link. Alternatively, other wireless technologies, such as a wireless local area network (WLAN), such as one in accordance with the IEEE 802.11b standard, may be used to implement wireless network 26.

Figure 2:
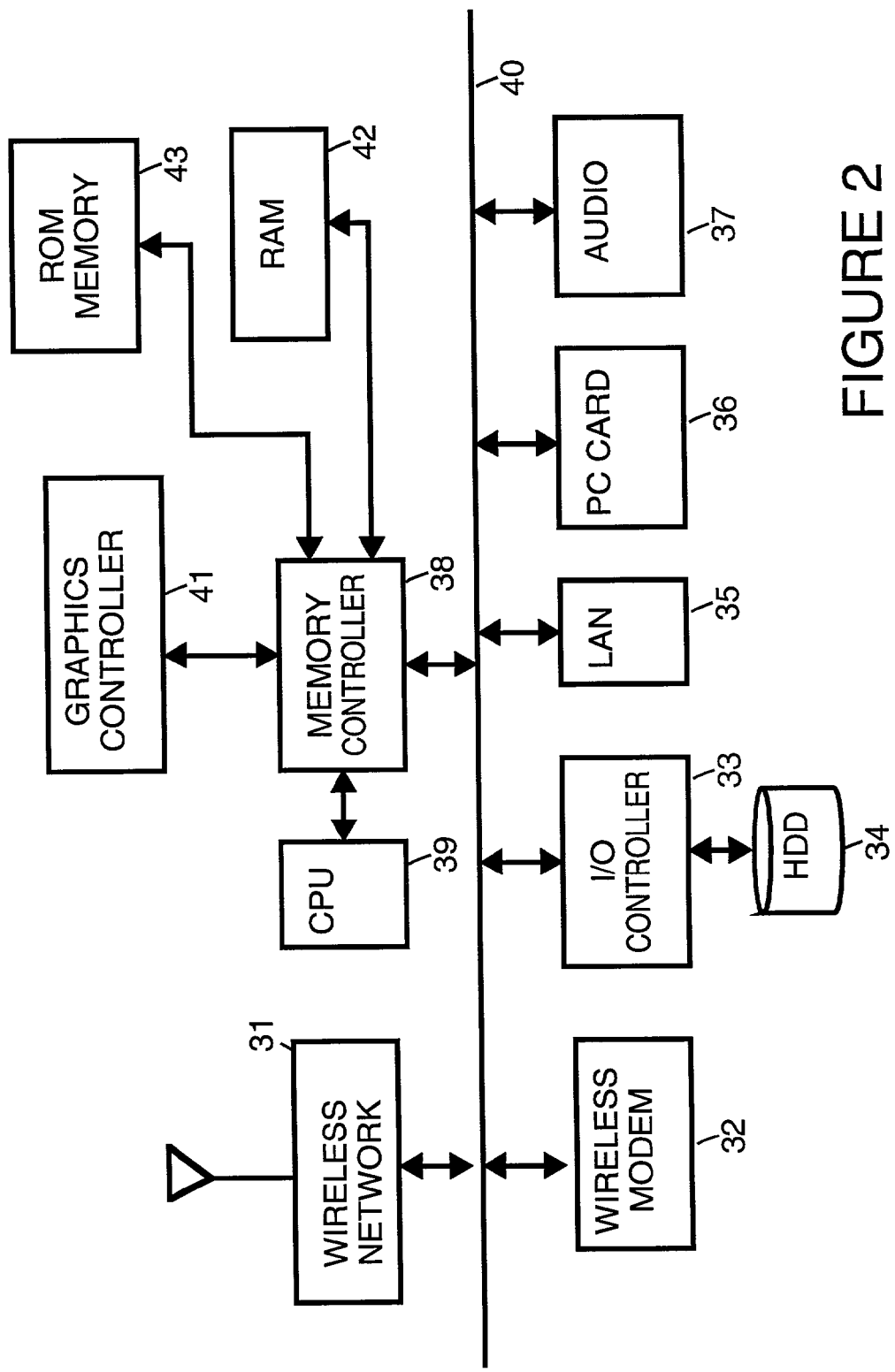
FIG. 2 is a simplified functional block diagram of the portable computer.

FIG. 2 is a simplified functional block diagram of portable computer 22. Connected to an input/output (I/O) bus 40 is an I/O controller 33, a local area network (LAN) interface 35, a PC card interface 36, an audio interface 37, a wireless network interface 31, a wireless modem interface 32 and a memory controller 38. Other entities may be connected to I/O bus 40 as well, such an interface to a wired modem. Wireless modem interface 32 allows portable computer 22 to communicate with phone networks. Wireless modem interface 32, for example, includes cellular phone capability or provides connection wirelessly to a wired or wireless phone network.

I/O controller 33 is connected to a hard disk drive (HDD) 34. Memory controller 38 is connected to a central processing unit (CPU) 39, a graphics controller 41, random access memory (RAM) 42 and permanent storage memory 43. RAM 42 is, for example composed of dynamic RAM (DRAM). Permanent storage memory 43 contains, for example, read only memory (ROM), flash memory or some other kind of permanent storage.

Through wireless network interface 31 or wireless modem 32, portable computer 22 can be connected to the internet, receive e-mail, receive fax mail, receive telephone calls and so on.

Figure 3:
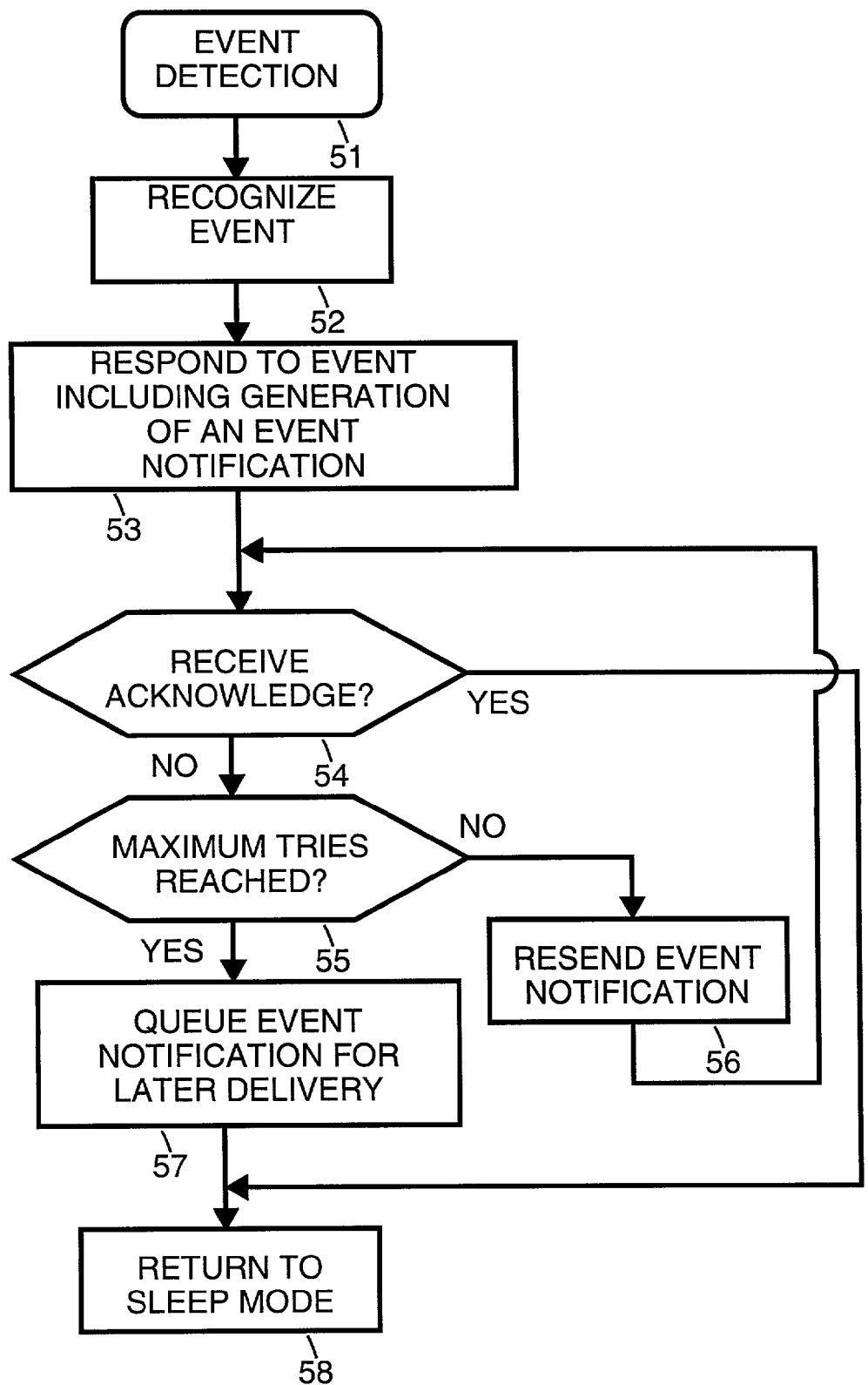
FIG. 3 is a flowchart that illustrates operation of the portable computer shown in FIG. 2 upon detection of an event in accordance with a preferred embodiment of the present invention.

FIG. 3 is a flowchart that illustrates operation of portable computer 22 upon the occurrence of an event which awakens portable computer 22 out of a sleep (suspend) mode. In a step 51, portable computer 22 detects an event. For example, the event is externally triggered, such as the receipt of an e-mail, a fax mail, a telephone call, an event over a LAN, positioning information or a request for information. Alternatively, the event is internally triggered such as an alarm or reminder set up within a calendar based program operating within portable computer 22. Since portable computer 22 is in a sleep (suspend) mode when the event occurs, the operating system of portable computer 22 wakes up to handle the event.

In a step 52, portable computer 22 recognizes the event. That is, portable computer 22 determines what event caused portable computer 22 to be aroused from sleep mode.

In a step 53, portable computer 22 responds to the event including performance of an event notification. For example, if no event notification is performed and portable computer 22 wakes up in a brief bag with little or no ventilation, the heat generated by portable computer 22 can become great enough to destroy the circuits and components within portable computer 22, unless portable computer 22 notifies a user that portable computer 22 has awakened and/or unless portable computer 22 returns to sleep mode.

One form of event notification is to have portable computer 22 beep continuously or play music to announce that it is awake. However, if portable computer 22 is unattended, the beeping can be an irritant to those nearby.

In the preferred embodiment of the present invention, after portable computer 22 wakes up to handle an event, portable computer 22 sends out an event notification message to the user. The event notification message is transmitted to a device separate from portable computer 22 where the event notification message can be displayed to a user. For example, the event notification message is sent out via wireless network interface 31 through wireless network 26 to PDA 17, pager 19, dedicated display device 16 or cell phone 20. Alternatively, the event notification message is sent out via wireless modem interface 32 through the phone system to PDA 17, pager 19, dedicated display device 16 or cell phone 20. The event notification is addressed, for example, to specific devices by using phone numbers or network addresses identified beforehand by a user of portable computer 22.

In the preferred embodiment of the present invention, the event notification message can include very specific information about the event. For example, if the event is an alarm for an approaching appointment, the event notification message includes a short message indicating the appointment. The event notification message can include caller identification and a portion or all of a voice message. This event notification message is displayed on the display screen of cell phone 20, pager 19, dedicated display device 16 or PDA 17. For example, the event notification message is sent out by portable computer 22 via wireless network 26 to allow a user a window into portable computer 22 such that the user can see and get notified of appointments as they come due without having to interact with personal computer 22. The event notification can be accompanied by transfer of information, such as an entire voice mail message, into memory of another computing device.

While not necessary in all embodiments of the invention, in portable computer 22 can wait for an acknowledgement of the event notification before returning to sleep mode. For example, in a step 54 a check is made to see if an acknowledgement is received. If not, in a step 55, a check is made to see if a maximum number of tries has been reached. If not, in a step 56 the event notification is resent. If a maximum number of tries has been reached, in a step 57, event notification is queued for later delivery. For example, at the next detected event, both the current event notification and any past undelivered event notifications can be delivered. Portable computer 22 can also be queried for messages by a remote device.

In a step 58, once portable computer 22 has sent out or is finished attempting to send out the event notification message, portable computer 22 places itself back into the suspend mode until the user returns to turn portable computer 22 on, or another event is detected.

In the preferred embodiment of the present invention, cell phone 20 and pager 19 have programmable buttons that allow cell phone 20 and pager 19 to initiate events in order to obtain information from portable computer 22. For example, cell phone 20 or pager 19 may request information about a next appointment or may perform a database look-up. Portable computer 22 responds to such an event with an event notification message that includes the information sought from portable computer 22. For example, in the preferred embodiment of the present invention, cell phone 20 and pager 19 can access a large database stored within portable computer 22 to obtain addresses, phone numbers and so on. In this way, a user can obtain information from portable computer 22 without having to physically open portable computer 22, search and access the information and then place portable computer 22 back into the sleep mode. While this functionality can also be added to PDA 17, in most cases, PDA 17 will already have large storage capacity sufficient to store critical information and so will not require such access to portable computer 22 outside of normal synchronization. Event notification can also be used to trigger a synchronization between portable computer 22 and a PDA.

Also, in the preferred embodiment of the present invention, portable computer 22, through wireless modem interface 32, is able to take voice mail. Acting as a cell phone, portable computer 22 can wake up to take a voice mail message and return to a suspend state after performing notification. In this case, instead of or in addition to sending an event notification message, portable computer 22 can leave a pop-up window that appears on the display screen of portable computer 22. The pop-up window is displayed on the display screen of portable 22 when the user again wakes up portable computer 22. The pop-up window informs the user of how many voice mail messages have been received. If an event notification message is to be sent, the event notification message is sent out, for example, via wireless network interface 31 through wireless network 26 to PDA 17, pager 19 or cell phone 20. Once portable computer 22 makes the notification, portable computer 22 places itself back into the suspend mode until the user returns to turn portable computer 22 on.

The foregoing discussion discloses and describes merely exemplary methods and embodiments of the present invention. As will be understood by those familiar with the art, the invention may be embodied in other specific forms without departing from the spirit or essential characteristics thereof. For example, the present invention was described using a portable computer. However, the invention applies to any computing system that has wireless capability. For example, the computing system can be a desktop computer, a personal digital assistant, and so on. Accordingly, the disclosure of the present invention is intended to be illustrative, but not limiting, of the scope of the invention, which is set forth in the following claims.

What is claimed is:

1. A method by which a computer interacts with a handheld device, the method comprising the following:

waking the computer from a sleep mode in response to the computer receiving a wireless communication directly from the handheld device with no intervening devices and no intermediary devices;

recognizing the wireless communication by the computer;

responding to the wireless communication by the computer, including the following:

generating and transmitting an event notification message to the handheld device, where the event notification message includes information related to the wireless communication;

waiting for an acknowledgement of the event notification message from the handheld device, resending the event notification message upon failing to receive the acknowledgment for a up to selected number of times; and, returning the computer to the sleep mode after receiving the acknowledgement or resending the event notification message for the selected number of times.

2. A method as in claim 1 wherein the transmission of the response by the computer is made directly to the handheld device via a wireless network.

3. A method as in claim 2 wherein the computer responds to the wireless communication by:

executing a calendaring program within the computer and transmitting calendar information to the handheld device.

4. A method as in claim 1 wherein the handheld device is a personal digital assistant (PDA).

5. The method of claim 1, where the sleep mode is a low power state.

6. A method by which a computer interacts, the method comprising:

waking the computer from a sleep mode in response to the computer receiving a wireless communication directly from a cellular phone device with no intervening devices and no intermediary devices;

recognizing the wireless communication by the computer;

if the wireless communication is a request for calendar related data from within the computer, performing an action by executing a calendaring program in response to the wireless communication by the computer that retrieves the calendar related data and wirelessly transmits the calendar related data to the cellular phone device;

waiting for an acknowledgement from the cellular phone device, resending the calendar related data upon failing to receive the acknowledgment; and, returning the computer to the sleep mode in response to transmitting the calendar related data after receiving the acknowledgement or resending the calendar related data for a selected number of times.

7. A method as in claim 6 wherein the wireless communication is performed via a wireless network.

8. The method of claim 6, where the sleep mode is a low power state.

9. Storage media, the storage media storing software which when executing on a computer performs a method by which the computer interacts with a handheld device, the method comprising the following:

waking the computer from a sleep mode in response to the computer receiving a wireless communication directly from the handheld device with no intervening devices and no intermediary devices;

recognizing the wireless communication by the computer;

generating and transmitting an event notification message to the hand held device, where the event notification message includes information related to the wireless communication;

if the wireless communication is a request for calendar related data from within the computer, performing an action in response to the wireless communication by the computer including executing a calendaring program that retrieves the calendar related data and causes the calendar related data to be transmitted to the handheld device; and, returning the computer to the sleep mode in response to performing the action.

10. Storage media as in claim 9 wherein the wireless communication is performed via a wireless network.

11. Storage media as in claim 9 where the wireless communication is recognized as being from a cellular telephone.

12. The storage media of claim 9, where the sleep mode is a low power state.

* * * * *

UNITED STATES PATENT AND TRADEMARK OFFICE
CERTIFICATE OF CORRECTION

| | | |
|---|---|---|
| PATENT NO. | : 7,657,765 B2 | Page 1 of 1 |
| APPLICATION NO. | : 10/081005 | |
| DATED | : February 2, 2010 | |
| INVENTOR(S) | : Jeffrey R. Oar et al. | |

It is certified that error appears in the above-identified patent and that said Letters Patent is hereby corrected as shown below:

In column 6, line 23, in Claim 9, delete "hand held" and insert -- handheld --, therefor.

Signed and Sealed this

Tenth Day of August, 2010

David J. Kappos
*Director of the United States Patent and Trademark Office*